(12) United States Patent
Numata et al.

(10) Patent No.: US 6,682,850 B1
(45) Date of Patent: Jan. 27, 2004

(54) NONAQUEOUS ELECTROLYTE SOLUTION SECONDARY BATTERY USING LITHIUM-MANGANESE COMPOSITE OXIDE FOR POSITIVE ELECTRODE

(75) Inventors: Tatsuji Numata, Tokyo (JP); Chika Kanbe, Tokyo (JP); Akira Kobayashi, Tokyo (JP); Masato Shirakata, Tokyo (JP); Masatomo Yonezawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/763,596
(22) PCT Filed: Aug. 26, 1999
(86) PCT No.: PCT/JP99/04608
§ 371 (c)(1), (2), (4) Date: Feb. 26, 2001
(87) PCT Pub. No.: WO00/13250
PCT Pub. Date: Mar. 9, 2000

(30) Foreign Application Priority Data

Aug. 27, 1998 (JP) .............................. 10/241912
Aug. 27, 1998 (JP) .............................. 10/241918

(51) Int. Cl.$^7$ ............................. H01M 4/50; H01M 4/52
(52) U.S. Cl. .................... 429/224; 429/209; 429/218.1; 429/223; 429/304
(58) Field of Search .............................. 429/209, 218.1, 429/223, 224, 304

(56) References Cited

U.S. PATENT DOCUMENTS 6,007,947 A * 12/1999 Mayer ........................ 429/223

FOREIGN PATENT DOCUMENTS

| JP | 05-94822 | 4/1993 |
|----|----------|--------|
| JP | 06-60887 A | 3/1994 |
| JP | 06-243897 | 9/1994 |
| JP | 06-310143 A | 11/1994 |
| JP | 06-325791 | 11/1994 |
| JP | 07-29603 A | 1/1995 |
| JP | H07-320751 | 12/1995 |
| JP | 08-37007 | 2/1996 |
| JP | 08-171910 | 7/1996 |
| JP | 09-293538 A | 11/1997 |
| JP | 10-79244 A | 3/1998 |
| JP | 10-92429 A | 4/1998 |
| JP | 10-92430 | 4/1998 |
| JP | 10-112318 | 4/1998 |

OTHER PUBLICATIONS

Chemical Encyclopedia 8, Kyoritsu Publishing, Sep. 10, 1976, pp. 224–225.

W. Li et al., "Influence of morphology on the stability of LiNiO2", Journal of Power Sources, vol. 68, 1997, pp. 565–569.

Office Action from Korean Patent Office.

* cited by examiner

Primary Examiner—Carol Chaney
Assistant Examiner—Dah-Wei D. Yuan
(74) Attorney, Agent, or Firm—Sughrue Mion, PLLC (57) ABSTRACT

A positive electrode of a nonaqueous electrolyte solution secondary battery comprises (A) a lithium-manganese composite oxide and (B1) at least one lithium-nickel composite oxide which has a specific surface area X of $0.3 \leq X$ (m$^2$/g) and which is selected from a group consisting of $LiNiO_2$, $Li_2NiO_2$, $LiNi_2O_4$, $Li_2Ni_2O_4$ and $LiNi_{1-x}M_xO_2$ ($0 < x \leq 0.5$ is satisfied, and M represents at least one metal element selected from a group consisting of Co, Mn, Al, Fe, Cu and Sr), whereby it is possible to obtain a nonaqueous electrolyte solution secondary battery which is superior in battery properties, especially charge and discharge cycle properties, retention properties and safety.

8 Claims, 4 Drawing Sheets

NONAQUEOUS ELECTROLYTE SOLUTION SECONDARY BATTERY USING LITHIUM-MANGANESE COMPOSITE OXIDE FOR POSITIVE ELECTRODE

BACKGROUND OF THE INVENTION (i) Field of the Invention

The present invention relates to a nonaqueous electrolyte solution secondary battery. More particularly, the present invention relates to a lithium secondary battery or a lithium ion secondary battery, and to a nonaqueous electrolyte solution secondary battery having a high capacity and improved charge and discharge properties, especially improved cycle life duration and capacity retention properties/self-discharge properties.

(ii) Description of the Related Art

Lithium manganate is a material which is very expectable as one positive electrode material for a lithium ion secondary battery. This material system has been reported as a research subject of a magnetic behavior in 1950's (Journal of American Chemical Society, Vol. 78, pp. 3255–3260). Since M. M. Thackeray et al. reported that Lithium manganate could electrochemically absorbs/releases Li ions in Material Research Bulletin, Vol. 18, pp. 461–472 in 1983, it has been investigated as a positive electrode material for a lithium secondary battery (e.g., Journal of Electrochemical Society, Vol. 136, No. 11, pp. 3169–3174 or Journal of Electrochemical Society, Vol. 1138, No. 10, pp. 2859–2864).

This lithium manganate has a spinel structure represented by the chemical formula $LiMn_2O_4$, and functions as a 4V class positive electrode material with respect to a composition of $\lambda$-$MnO_2$. Since lithium manganate of the spinel structure has a three-dimensional host structure which is different from a layer structure of, e.g., $LiCoO_2$, most of its theoretical capacity can be used, and hence it is expected to be excellent in cycle properties.

However, in practice, the lithium secondary battery in which lithium manganate is used as the positive electrode cannot avoid capacity deterioration that the capacity is gradually lowered by repeating charge and discharge, and there remains such a serious problem in practical use of lithium manganate.

Various methods have been investigated in order to improve the cycle properties of an organic electrolyte solution secondary battery in which lithium manganate is used for the positive electrode. For example, there are characteristic improvement by enhancing reactivity at the time of synthesization (disclosed in, e.g., Japanese Patent Applications Laid-Open Nos. 67464/1991, 119656/1991, 127453/1991, 245106/1995 and 73833/1995), characteristic improvement by controlling a particle diameter (disclosed in, e.g., Japanese Patent Applications Laid-Open Nos. 198028/1992, 28307/1993, 295724/1994 and 97216/1995), and characteristic improvement by removing impurities (disclosed in, e.g., Japanese Patent Applications Laid-Open No. 21063/1993), but none of them can achieve the satisfactory improvement in cycle properties.

Besides the above applications, Japanese Patent Applications Laid-Open No. 270268/1990 discloses an attempt that a composition ratio of Li is set to be sufficiently excessive with respect to a stoichiometry ratio to improve the cycle properties. The synthetic techniques of composite oxides having the similar excessive Li composition are also disclosed in, e.g., Japanese Patent Applications Laid-Open Nos. 123769/1992, 147573/1992, 205744/1993 and 282798/1995. Improvement in the cycle properties by these techniques can be apparently confirmed by experiments.

Furthermore, with the intention of obtaining an effect similar to the case of using the Li excessive composition, there is also disclosed, in Japanese Patent Applications Laid-Open Nos. 338320/1994 and 262984/1995 and the like, a technique of using a positive electrode active material prepared by mixing an Mn spinel material $LiMn_2O_4$ with an Li—Mn composite oxide $Li_2Mn_2O_4$, $LiMnO_2$, $Li_2MnO_3$ or the like which is richer in Li than the above spinel material.

When Li is excessively added or mixed with the other Li-rich compound, the cycle properties are improved, but on the other hand, a charge and discharge capacity value and a charge and discharge energy value decrease, so that there is a problem that both of the high energy density and the long cycle life duration cannot be achieved. On the contrary, Japanese Patent Applications Laid-Open No. 275276/1994 aims at the high energy density, improvement in high-rate charge and discharge properties (an electric current at the time of charge and discharge is large with respect to a capacity), and the perfectibility of reaction to enlarge a specific surface area, but on the contrary, the long cycle life duration is hard to be achieved.

On the other hand, there have also been conducted investigations for improvement in the properties by adding another element to a compound having three components of Li, Mn and O. For example, they include techniques of adding Co, Ni, Fe, Cr, Al or the like, and doping with such an element (which are disclosed in Japanese Patent Applications Laid-Open Nos. 141954/1992, 160758/1992, 169076/1992, 237970/1992, 282560/1992, 289662/1992, 28991/1993 and 14572/1995). The addition of these metal elements involves the reduction in the charge and discharge capacity, and more ingenuities are necessary for satisfaction as the total performance.

In the investigation of the techniques of adding another element, the addition of boron is expected, because it permits the achievement of improvement in other properties, e.g., cycle properties or self-discharge properties without substantially reducing the charge and discharge capacity. For example, Japanese Patent Applications Laid-Open Nos. 253560/1990, 297058/1991 and 115515/1997 disclose such a technique. In any of these applications, manganese dioxide or an Li—Mn composite oxide is solid-mixed with a boron compound (e.g., boric acid) or immersed into an aqueous solution of a boron compound and then subjected to a heat treatment to synthesize a composite oxide of lithium, manganese and boron. Since the complex particle powder of the boron compound and the manganese oxide has a reduced surface activity, it is expected that the reaction with the electrolyte solution is suppressed and the capacity holding properties are improved.

However, the mere addition of boron causes disadvantages such as the reduction in grain growth or tap density, and hence, it cannot directly lead to the realization of the high capacity as a battery. Further, the reduction in the capacity in an effective potential range when combined with a carbon negative electrode is observed depending on synthetic conditions, or the suppression of the reaction with the electrolyte solution is insufficient sometimes. Therefore, the addition of boron is not always effective for improvement in the capacity retention properties.

Various approaches have been made for improving the cycle properties of lithium manganate as described above. For realizing the cycle properties comparable to a Co system which is currently a mainstream, especially the cycle properties during use at a high temperature, more investigations are required since a deterioration mechanism is promoted in the high-temperature use environment. In particular, on considering the future spread of application fields such as a notebook computer and an electric vehicle, the assurance of the cycle properties at a high temperature becomes more important.

As described above, lithium manganate $LiMn_2O_4$ is a composite oxide which is largely expected as an alternative material for the positive electrode active material $LiCoO_2$ which is currently a mainstream, but the conventional battery using $LiMn_2O_4$ have two problems, i.e., (1) difficulty in realizing both of the high energy density (high charge and discharge capacity) and the high cycle life duration, and (2) reduction in the retained capacity due to self-discharge.

Technical drawbacks in battery production and compatibility with the electrolyte solution are pointed out as causes of these problems, but the following can be considered when paying attention to the positive electrode material itself or the influence due to the positive electrode material.

As causes for preventing the realization of the high energy density, there are unevenness of reaction, separation of phases, excessive imbalance of the composition ratio between Li and Mn, influence of impurities, lack of the tap density and others.

Unevenness of reaction and separation of phases depend on the synthesization process. However, in case of a process in which baking is performed after dry blending, the above-described problem is determined by a particle diameter of a starting material and a calcination temperature. That is, since reaction proceeds on the solid phase surface, when mixture of the Li source and the Mn source is insufficient, the particle diameter is too rough or the calcination temperature is too high, phases such as $Mn_2O_3$, $Mn_3O_4$, $Li_2MnO_3$, $LiMnO_2$, $Li_2Mn_2O_4$, $Li_2Mn_4O_9$, $Li_4Mn_5O_{12}$ and others are generated to provoke reduction in a battery voltage and in the energy density.

As causes of the deterioration of the capacity involved by the charge and discharge cycle, there are changeover of an average valence of the Mn ion between the trivalent value and the quadrivalent value as electric charge compensation involved by absorption/release of Li to thereby generate Jahn-Teller distortion in the crystal, and elution of Mn from lithium manganate increases the impedance due to elution of Mn. That is, as causes of the deterioration of the capacity such that repetition of the charge and discharge cycle lowers the charge and discharge capacity, there can be considered influence of impurities, elution of Mn from lithium manganate and separation of the eluted Mn onto the negative electrode material or a separator, inactivation due to isolation of the active material particle, influence of acid generated from the contained moisture, the deterioration of the electrolyte solution due to emission of oxygen from lithium manganate.

Assuming that a single spine phase is formed, as causes of elusion of Mn, it can be considered that the trivalent Mn in the spinel structure partially becomes the quadrivalent Mn and the divalent Mn so that Mn can be readily dissolved in the electrolyte solution and that relative lack of the Li ion can lead to such elution. Therefore, the irreversible capacity can be generated or disturbance of the atomic arrangement in the crystal can be promoted due to repetition of charge and discharge, and it can be considered that the eluted Mn ion is separated out on the negative electrode or the separator to prevent the Li ion from moving. Further, when the Li ion is added or removed to/from lithium manganate, the cubic symmetry is distorted due to the Jahn-Teller effect to involve a several % of expansion/contraction of a unit crystal lattice length. Therefore, it can be resumed that the repetition of the cycle partially causes an electrical contact failure or does not permit the isolated particle to function as the electrode active material.

Furthermore, it is also considered that elution of Mn facilitates emission of oxygen from lithium manganate. Lithium manganate with a large amount of oxygen deficiency shows increased the 3.3 V plateau capacity, and its cycle property is also thereby deteriorated. Moreover, elution of a large amount of oxygen is presumed to affect decomposition of the electrolyte solution and the deterioration of the electrolyte solution leads to degradation of the cycle. In order to solve this problem, improvement in the synthesization method, addition of another transition metal element, Li-excessive composition and others have been investigated, but assuring of the high charge and discharge capacity and the high cycle life duration cannot be simultaneously satisfied. Therefore, reduction in Mn elution, in the crystal lattice distortion and in lack of oxygen can be derived as countermeasures.

As causes of the reduction in the retained capacity due to self-discharge, when internal short-circuit phenomenons such as insufficient alignment of the positive and negative electrodes caused in a battery production process or contamination with electrode metal dust are excluded, it can be considered that improvement in the retention properties are advantageous for stability improvement of lithium manganate to the electrolyte solution, i.e., elution of Mn, reaction with the electrolyte solution, suppression of oxygen release and others.

In particular, the fact that these degradations proceeds during use in the high temperature environment is an obstacle of enlargement of the application fields. However, since the material system which can be expected for its potential capable of satisfying performances required in the current high performance secondary battery such as high electromotive force, flatness of a voltage during discharge, cycle properties, or the energy density is limited, lithium manganate with a new spinel structure whose charge and discharge capacity is not deteriorated and which is superior in the cycle properties and retention properties.

Japanese Patent Applications Laid-Open No. 12318/1998 discloses that a mixed oxide obtained from a lithium-manganese composite oxide such as $LiMn_2O_4$ and a lithium-nickel composite oxide such as $LiNiO_2$ is used as a positive electrode active material. According to this patent publication, the irreversible capacity in the initial charge and discharge is compensated, thereby obtaining a large charge and discharge capacity. In addition, Japanese Patent Applications Laid-Open No. 235291/1995 also discloses mixture of $LiCo_{0.5}Ni_{0.5}O_2$ into a lithium-manganese composite oxide such as $LiMn_2O_4$ to be used as a positive electrode active material.

However, according to investigations carried out by the present inventors, solely using as the positive electrode material the mixed oxide obtained from the lithium-manganese composite oxide and the lithium-nickel composite oxide cannot acquire a satisfactory result in the charge and discharge properties, particularly in the cycle life duration and the capacity retention properties/self-discharge properties at a high temperature.

Further, Japanese Patent Applications Laid-Open No. 199508/1998 discloses use of $LiMn_{1.2}Ni_{0.8}O_4$ having an average particle diameter of 5.4 μm and $LiMn_2O_4$ as a positive electrode active material. However, according to investigations by the present inventors, even if the lithium-nickel composite oxide is used, the spinel type ($AB_2O_4$ type) containing Mn such as $LiMn_{1.2}Ni_{0.8}O_4$ cannot obtain a satisfactory result.

DISCLOSURE OF THE INVENTION

In view of the above-described drawbacks, it is an object of the present invention to provide a nonaqueous electrolyte solution secondary battery superior in battery properties, particularly in charge and discharge cycle properties, retention properties and safety.

As a result of intensive investigations aiming at reduction in the elution of Mn from a lithium-manganese composite oxide as a positive electrode active material in order to achieve the above object, the present inventor has reached the present invention. When mixing the lithium-nickel composite oxide to provide a positive electrode in particular, the surface area or the particle diameter and the composition of the lithium-nickel composite oxide largely influence on improvement in the charge and discharge properties, particularly in the cycle life duration and the capacity retention properties/self-discharge at a high temperature.

A first aspect of the present invention is directed to a nonaqueous electrolyte solution secondary battery using a lithium-manganese composite oxide for a positive electrode, said battery comprising an electrolyte solution including a component which reacts with water to generate hydrogen ions, and a hydrogen ion capturing agent being arranged at a position where it comes into contact with the electrolyte solution in the battery.

In the nonaqueous electrolyte solution secondary battery using the lithium-manganese composite oxide as a positive electrode active material, the deterioration of the cycle properties is generated by the elution of Mn ions in the electrolyte solution, and hence, such deterioration can be determined by using Mn ion concentration in the electrolyte solution as an index, and the degradation of the capacity retention properties can be determined on the basis of the change of Li ion concentration in the electrolyte solution.

According to investigations by the present inventors, when $LiPF_6$ or $LiBF_4$ was used as a Li base electrolyte salt, an elution quantity of the Mn ion into the electrolyte solution was extremely large. On the other hand, when such base electrolyte salts were used, a degree of acidity of the electrolyte solution was apparently high. It is, therefore, presumed that these base electrolyte salts react with a minute amount of water in the organic electrolyte solution to generate the hydrogen ion ($H^+$), which causes elution of manganese in the lithium-manganese composite oxide to degrade the crystal structure.

Thus, it is considered that increase in the hydrogen ion concentration in the electrolyte solution can be suppressed to thereby reduce elution of the Mn ion into the electrolyte solution by placing a compound capable of capturing the hydrogen ion at a position where it can come into contact with the electrolyte solution. Actually, using the hydrogen ion capturing agent was able to greatly reduce the Mn ion which elutes into the electrolyte solution and suppress changes in the Li ion concentration existing in the electrolyte solution. Further, degradation and discoloration of the electrolyte solution was suppressed, and a quantity of acid generated was reduced. As a result of reduction in the elution quantity of the Mn ion into the electrolyte solution, desorption of oxygen from the lithium-manganese composite oxide can be also reduced, thereby preventing the deterioration of the crystal structure of the lithium-manganese composite oxide.

Consequently, according to the present invention, the cycle properties can be improved while keeping the high charge and discharge capacity, and suppression of decomposition of the electrolyte solution or changes in the Li concentration can avoid increase in the impedance.

Further, another aspect of the present invention is directed to a nonaqueous electrolyte solution secondary battery, wherein a positive electrode comprises: (A) a lithium-manganese composite oxide; and (B1) at least one lithium-nickel composite oxide which has a specific surface area X of $0.3 \leq X$ (m²/g) and which is selected from a group consisting of $LiNiO_2$, $Li_2NiO_2$, $LiNi_2O_4$, $Li_2Ni_2O_4$ and $LiNi_{1-x}M_xO_2$ (where $0<x \leq 0.5$, and M represents at least one metal element selected from a group consisting of Co, Mn, Al, Fe, Cu and Sr).

Further, still another aspect of the present invention is directed to a nonaqueous electrolyte solution secondary battery, wherein a positive electrode comprises: (A) a lithium-manganese composite oxide; and (B2) at least one lithium-nickel composite oxide which has a $D_{50}$ particle diameter of not more than 40 μm and which is selected from a group consisting of $LiNiO_2$, $Li_2NiO_2$, $LiNi_2O_4$, $Li_2Ni_2O_4$ and $LiNi_{1-x}M_xO_2$ (where $0<x \leq 0.5$ is satisfied, and M represents at least one metal element selected from a group consisting of Co, Mn, Al, Fe, Cu and Sr).

In these cases, when a weight ratio between the lithium-manganese composite oxide and the lithium-nickel composite oxide is represented by [Li—Mn composite oxide]:[Li—Ni composite oxide]=(100−a):a, $3<a \leq 45$ is preferable.

According to investigations by the present inventors, when (B1) the lithium-nickel composite oxide having a specific surface area X of $0.3 \leq X$ (m²/g) or (B2) a specific lithium-nickel composite oxide having a $D_{50}$ particle diameter of not more than 40 μm was mixed with the lithium-manganese composite oxide as the positive electrode active material to be used, it revealed that (1) a quantity of the Mn ion eluted into the electrolyte solution was greatly reduced, (2) changes in the Li ion concentration existing in the electrolyte solution also became small and (3) degradation and discoloration of the electrolyte solution was suppressed and generation of acid was also reduced. Further, it is notable that the dependence of the specific surface area or the particle diameter is large.

As the reason, it can be considered that in the positive electrode, the lithium-nickel composite oxide having the specified composition and a specified specific surface area or a specified $D_{50}$ particle diameter captures the hydrogen ion. As a reaction mechanism, absorption of the hydrogen ion and release of the Li ion in turn can be assumed, for example. Further, there is a possibility such that the lithium-nickel composite oxide has a given anticatalytic function with respect to reaction among three i.e. the lithium-manganese composite oxide, the electrolyte solution and water.

In any case, by mixing the lithium-manganese composite oxide with a specific lithium-nickel composite oxide in the positive electrode, the generation of an acid in the electrolyte solution can be suppressed, and a quantity of Mn eluted from the lithium-manganese composite oxide such as lithium manganate into the electrolyte solution can be reduced. At the same time, desorption of oxygen from a lithium-manganese composite oxide such as lithium manganate can be similarly reduced. Therefore, since degradation of the structure of the lithium-manganese composite oxide can be suppressed and decomposition of the electrolyte solution or changes in the Li concentration can be also restrained, the battery impedance can be prevented from increasing. Accordingly, the cycle properties and the capacity holding properties can be improved. The present invention is superior in the cycle properties and the capacity holding capacities even if a base electrolyte salt which can readily generate acid such as $LiPF_6$ or $LiBF_4$ is used in particular.

Moreover, when a material system whose charge and discharge capacity is larger than that of the lithium-manganese composite oxide is used as the lithium-nickel composite oxide, realization of the high capacity can be also achieved as a secondary effect.

Additionally, assuming that a mixing ratio between the lithium-manganese composite oxide and the lithium-nickel composite oxide is represented by [Li—Mn composite oxide]:[Li—Mi composite oxide]=100−a:a, a mixing ratio of $3 \leq a$ can reduce a quantity of Mn eluted from the lithium-manganese composite oxide into the electrolyte solution can be reduced, thereby improving the cycle properties and the capacity holding properties. Further, although it is known that the lithium-nickel composite oxide is generally inferior in safety as compared with the lithium-manganese composite oxide, a mixing ratio of $a \leq 45$ can obtain the nonaqueous electrolyte solution secondary battery which has the extremely high safety that the lithium-manganese composite oxide essentially has.

BEST MODE FOR CARRYING OUT THE INVENTION

As a positive electrode active material according to the present invention, a lithium-manganese composite oxide which is used solely or together with a lithium-nickel composite oxide is an oxide consisting of lithium, manganese and oxygen. As the lithium-manganese composite oxide, there are lithium manganate such as $LiMn_2O_4$ having the spinel structure, $Li_2Mn_2O_4$, $LiMnO_2$ and others. Among theses, lithium manganate such as $LiMn_2O_4$ having the spinel structure is preferable. A ratio of [Li]/[Mn] may deviate from 0.5 as long as the spinel structure is maintained. The ratio of [Li]/[Mn] is 0.5 to 0.65, or preferably 0.51 to 0.6, or most preferably 0.53 to 0.58.

Similarly, the ratio of [Li+Mn]/[O] may deviate from 0.75 as long as lithium manganate takes the spinel structure.

Further, taking easiness of slurry production suitable for manufacturing a positive electrode and uniformity of battery reaction into consideration, a particle diameter of the lithium-manganese composite oxide is usually 5 to 30 $\mu$m as a weight average particle diameter.

Such a lithium-manganese composite oxide can be manufactured as follows.

In regard to a manganese (Mn) material and a lithium (Li) material, a lithium compound such as lithium carbonate, lithium nitrate, lithium hydroxide can be used as an Li material, and various kinds of Mn oxides such as electrolytic manganese dioxide (EMD), $Mn_2O_3$, $Mn_3O_4$ or chemical manganese dioxide (CMD) or a manganese compound, e.g., manganese salt such as manganese carbonate or manganese oxalate can be used as an Mn material. However, taking easiness of assuring a composite ratio between Li and Mn, energy density per unit volume obtained due to a difference in bulk density, easiness of assuring a target particle diameter, convenience of process/handling for industrial mass synthesization, presence/absence of generation of a harmful material, cost and others into consideration, a combination of electrolyte solution manganese dioxide and lithium carbonate is preferable.

As a preliminary step toward mixing starting materials, it is preferable that the lithium material and the manganese material are pulverized to have an appropriate uniform particle diameter according to needs. A particle diameter of the Mn material is usually 3 to 70 $\mu$m, or preferably 5 to 30 $\mu$m. Further, a particle diameter of the Li source is usually not more than 10 $\mu$m, or preferably not more than 5 $\mu$m, or most preferably not more than 3 $\mu$m.

Since the generation reaction of the lithium-manganese composite oxide proceeds on a solid phase surface, if mixing of the Li source and the Mn source is insufficient or the particle diameters are too coarse, the lithium-manganese composite oxide having a desired composition and structure may not be obtained. For example, when manufacturing lithium manganate having the spinel structure, if mixing of the Li source and the Mn source is insufficient or the particle diameters are too coarse, phases such as $Mn_2O_3$, $Mn_3O_4$, $Li_2MnO_3$, $Li_2Mn_4O_9$ or $Li_4Mn_5O_{12}$ may be generated. And the battery voltage or the energy density may be lower than those of lithium manganate having the spinel structure. Therefore, in order to obtain the lithium-manganese composite oxide having a desired composition and structure, it is preferable to use the above-described particle diameter for enhancing the uniformity of reaction and increasing the contact area of the manganese material. Thus, the particle diameter control or granulation of the mixed powder may be performed. Further, controlling the particle diameter of the raw material is useful to obtain the lithium-manganese composite oxide having a target particle diameter.

Subsequently, the respective raw materials are taken in such a manner that a mole ratio of Li/Mn matches with the composition ratio of the target lithium-manganese composite oxide. They are sufficiently mixed and baked in the oxygen atmosphere. As oxygen, pure oxygen may be used, or mixed gas of inactive gas such as nitrogen or argon may be used. At this time, the partial pressure of oxygen is approximately 50 to 760 torr.

Although a baking temperature is usually 400 to 1000° C., an appropriate temperature is selected so that a desired phase can be obtained. For example, if the baking temperature is too high when manufacturing lithium manganate having the spinel structure, a undesirable phase such as $Mn_2O_3$ or $Li_2MnO_3$ may be generated and the battery voltage and the energy density may not be sufficient. Further, when the baking temperature is too low, an amount of oxygen may be relatively excessive or the fine particle density may be small, which is also undesirable for realizing the high capacity. Therefore, when manufacturing lithium manganate having the spinel structure, the baking temperature is preferably 600 to 900° C. or most preferably 700 to 850° C.

Although a baking time can be appropriately adjusted, it is usually 6 to 100 hours, or preferably 12 to 48 hours. A cooling speed can be appropriately adjusted, but rapid cooling should not be performed during the final baking processing. The cooling speed of not more than, e.g., approximately 100° C./h is preferable.

The thus obtained fine particle of the lithium-manganese composite oxide is classified according to needs to obtain the uniformized particle size so that the lithium-manganese composite oxide is used as a positive electrode active material. Alternatively, in one preferred embodiment according to the present invention, this material is further mixed with a specified lithium-nickel composite oxide to be used as a positive electrode active material.

The hydrogen ion capturing agent used in one preferred embodiment according to the present invention reacts with the hydrogen ion ($H^+$) existing in the organic electrolyte solution to lower the hydrogen ion concentration. Here, it is preferable to use the hydrogen ion capturing agent which changes into a compound that does not adversely affect the battery system according to the present invention or an inactive compound as a result of reaction with the hydrogen ion. On the other hand, the agent which generates water as a result of reaction with the hydrogen ion is not suitable for the present invention since the water again reacts with the base electrolyte salt to produce the hydrogen ion. For example, the hydrogen ion capturing agent such as an alkali metal hydroxide is not preferable since the $OH^-$ ion reacts with the hydrogen ion to generate water. Further, the agent which excessively increases the impedance of the battery as a result of reaction is not preferable.

The hydrogen ion capturing agent may be placed at any position as far as it can come into contact with the electrolyte solution in the battery. For example, the hydrogen ion capturing agent may be mixed with, dissolved or dispersed in the electrolyte solution or mixed with the electrode.

For example, if the hydrogen ion capturing agent can also serve as an electrode material, it can be mixed with the lithium-manganese composite oxide which is the positive electrode material used in the present invention to form the electrode. As the hydrogen ion capturing agent, either an inorganic compound or an organic compound may be used. For example, there are a lithium-nickel composite oxide, solid metal hydride, carbon capable of absorbing hydrogen and others. It is preferable to use these materials in the form of the fine particle, and they can be mixed with the positive electrode or dispersed in the electrolyte solution to be used. The usable lithium-nickel composite oxide has a hydrogen ion capturing function. For example, it cannot be said that the lithium-nickel composite oxide disclosed in the above-described Japanese Patent Applications Laid-Open No. 112318/1998 necessarily has the hydrogen ion capturing function.

Description will now be given as to the lithium-nickel composite oxide used in each mode according to the present invention. The lithium-nickel composite oxide is an oxide consisting of lithium, nickel and oxygen, and there are $LiNiO_2$, $Li_2NiO_2$, $LiNi_2O_4$, $Li_2Ni_2O_4$, and any other oxide obtained by partially doping another element to theses oxide in order to realize stability or high capacity or improve safety. As one obtained by partially doping another element, an oxide obtained by doping another element to, e.g., $LiNiO_2$ can be represented by $LiNi_{1-x}M_xO_2$ ($0<x\leq0.5$), where M is a dope metal element which is at least one metal element selected from a group consisting of Co, Mn, Al, Fe, Cu and Sr. M may be two or more dope metal elements as long as the sum of the composition ratios of the dope metal elements is x.

Among others, $LiNiO_2$ and $LiNi_{1-x}Co_xO_2$ (in this case, x is usually 0.1 to 0.4) are preferable.

It is to be noted that an Li/Ni ratio (Li/[Ni+M] ratio in case of $LiNi_{1-x}M_xO_2$) of the lithium-nickel composite oxide may slightly deviate from the represented stoichiometry ratio in this invention. The lithium-nickel composite oxide used in each mode of the present invention includes such a case.

In the present invention, by using the lithium-nickel composite oxide having a specific surface area X of not less than 0.3, it is possible to effectively prevent the deterioration of the lithium-manganese composite oxide or the electrolyte solution. Further, the specific surface area is usually not more than 5.0. When the specific surface area is not more than 3.0, manipulation for producing the positive electrode can be facilitated and a slurry capable of easily carrying out electrode coating can be preferably obtained.

In the present invention, the above-described lithium-nickel composite oxide which can be used has a $D_{50}$ particle diameter of not more than 40 μm. When the composite oxide having a $D_{50}$ particle diameter of not more than 40 μm is used, it is possible to effectively prevent the deterioration of the lithium-manganese composite oxide or the electrolyte solution. The lithium-nickel composite oxide usually has a $D_{50}$ particle diameter of not less than 1 μm. It is preferred to use one having a $D_{50}$ particle diameter of not less than 3 μm because manipulation for manufacturing the positive electrode is facilitated, and a slurry with which the electrode is easily coated can be obtained.

It is to be noted that the specific surface area represents the surface area ($m^2/g$) per fine particle unit weight and is measured by the laser beam scattering measuring method.

Such a lithium-nickel composite oxide can be manufactured as follows. As the lithium raw material, it is possible to employ a lithium compound such as lithium carbonate, lithium oxide, lithium nitrate or lithium hydroxide and the like. Further, as the nickel (Ni) raw material, it is possible to use nickel hydroxide, nickel oxide, nickel nitrate, and the like.

It is preferable to pulverize both the lithium raw material and the nickel raw material according to needs to provide an appropriate uniform particle diameter. In particular, the particle diameter of the nickel raw material may be preferably classified for use in order to obtain a predetermined specific surface area or $D_{50}$ particle diameter.

Thereafter, appropriate amounts of both materials are taken to meet the composition ratio of the lithium-nickel composite oxide targeted by the Li/Ni ratio and sufficiently mixed. Subsequently, they are baked as similar to manufacture of the lithium-manganese composite oxide. A baking temperature is approximately 500 to 900° C. The lithium-nickel composite oxide having a desired specific surface area or $D_{50}$ particle diameter can be obtained by further preferably classifying the baked lithium-nickel composite oxide. Since such a lithium-nickel composite oxide is effective as a positive electrode active material, it can be preferably mixed with the lithium-manganese composite oxide to be used as a positive electrode material. Further, it may be dispersed in the electrolyte solution to be used as the hydrogen ion capturing agent.

It is to be noted that in addition to the mixture of the lithium-manganese composite oxide and the lithium-nickel composite oxide, a compound such as $LiCoO_2$ generally known as a positive electrode active material may be mixed with the positive electrode material in the present invention. Further, a generally used additive such as $Li_2CO_3$ may be added for safety and the like.

Although a method for manufacturing the positive electrode is not restricted to a given type, the fine particles of the lithium-manganese composite oxide and the fine particles of the lithium-nickel composite oxide are mixed together with, e.g., a conductivity-enhancing agent and a binder by using an appropriate dispersion medium capable of dissolving the binder (the slurry method) and the obtained material is applied onto a collector such as an aluminum foil, for example. Thereafter, the solvent is removed and the material is then compressed by using, e.g., a press to form a film.

It is to be noted that the conductivity-enhancing agent is not restricted to a specific type, and a generally used agent such as carbon black, acetylene black, natural graphite, artificial graphite or carbon fiber can be used. A generally used binder such as polytetrafluoroethylene (PTFE) or polyvinylidene fluoride (PVDF) can be used.

On the other hand, as a negative electrode active material, lithium, lithium alloy or graphite or a carbon material such as amorphous carbon capable of absorption/release lithium can be used.

Although a separator is not restricted to a certain type, textile fabric, glass fiber, porous synthetic resin film and the like may be used. For example, a polypropylene- or polyethylene-based porous film is adequate since it is thin and suitable in terms of enlargement of area, film strength or film resistance.

A generally used nonaqueous electrolyte solution solvent can suffice. For example, carbonate, chlorinated hydrocarbon, ether, keton, nitrile and others can be used. Preferably, at least one solvent having a high dielectric constant is selected from ethylene carbonate (EC), propylene carbonate (PC), γ-butyrolactone (GBL) and others, and at least one solvent having a low viscosity is selected from diethyl carbonate (DEC), dimethyl carbonate (DMC), ethyl methyl carbonate (EMC) and esters. A mixture of the thus selected solvents is used. EC+DEC, PC+DMC or PC+EMC is preferable.

As the base electrolyte salt, at least one is selected from $LiClO_4$, LiI, $LiPF_6$, $LiAlCl_4$, $LiBF_4$, $CF_3SO_3Li$ and the like. In the present invention, since acid in the electrolyte solution can be suppressed even if the base electrolyte salt which is apt to generate acid is used, the greatest effect can be preferably demonstrated even if $LiPF_6$ or $LiBF_4$ is used in particular. The concentration of the base electrolyte salt is, e.g., 0.8 to 1.5 M.

As the structure of the battery, it is possible to adopt various shapes such as a square shape, a paper-like shape, a lamination layer type shape, a cylindrical shape, a coin-like shape and the like. Although a current collector, an insulating plate and the like are used as the constituent parts, these are not restricted to certain types, and they may be selected in accordance with the above shapes.

EXAMPLES

The present invention will now be described in detail based on examples, but the present invention is not restricted to them. It is to be noted that the specific surface area was measured by using Quanta Sorb manufactured by Quanta Chrome, and the $D_{50}$ particle diameter was measured by using FRA manufactured by Micro Trac.

Evaluation Test Example A-1

In order to synthesize lithium manganate, lithium carbonate ($Li_2CO_3$) and electrolytic synthesized manganese dioxide (EMD) were used as starting materials.

As a preliminary step toward mixing the above starting materials, pulverization of $Li_2CO_3$ and classification of EMD were carried out in order to improve reactivity and obtain lithium manganate having a target particle diameter. In cases where lithium manganate is used as the positive electrode active material, since the weight average particle diameter of 5 to 30 μm is preferable in view of assuring uniformity of reaction, easiness of slurry production and safety, the particle diameter of EMD was also determined as 5 to 30 μm which is the same as a target particle diameter of lithium manganate.

On the other hand, since the $Li_2CO_3$ particle diameter of not more than 5 μm is preferable for assuring uniform reaction, $Li_2CO_3$ was pulverized so that the $D_{50}$ particle diameter became 1.4 μm.

EMD and $Li_2CO_3$ which were adjusted to have the specified particle diameter were mixed so that [Li]/[Mn]= 1.05/2 could be obtained.

The obtained mixed powder was baked under the oxygen flow atmosphere at 800° C. Subsequently, the fine particles having the particle diameter of not more than 1 μm were removed from the resultant lithium manganate particles by an air classifier. At this time, the specific surface area of the obtained lithium manganate was approximately 0.9 m$^2$/g.

There was obtained a fine particle characteristic such that the tap density was 2.17 g/cc, the true density was 1.09 g/cc, the $D_{50}$ particle diameter was 17.2 μm, and the crystal lattice constant was 8.227 Å.

On the other hand, as the lithium-nickel composite oxide, $LiNiO_2$ having a specific surface area of 1.7 m$^2$/g was prepared.

Lithium manganate and $LiNiO_2$ prepared as described above were mixed at a ratio shown in Table A-1. 5g of the above mixed powder and 10 cc of the electrolyte solution of the mixed solvent (50:50 (volume %)) obtained from propylene carbonate (PC) and dimethyl carbonate (DMC) containing $LiPF_6$ (concentration: 1M) were put in sealed containers.

These sealed containers were heated at 80° C. and left for 20 days. Thereafter, the electrolyte solution was extracted, and the Mn ion concentration in the electrolyte solution was analyzed by using ICP. The result is shown in Table A-1.

Further, evaluation using $LiMn_{1.8}Ni_{0.2}O_4$ instead of $LiNiO_2$ was also carried out for comparison.

TABLE A-1

| a<br>($LiNiO_2$ Mixing Ratio) | Mn Concentration in<br>Electrolyte solution |
|---|---|
| 0% | 2320 ppm |
| 2% | 1792 ppm |
| 3% | 773 ppm |
| 5% | 623 ppm |
| 10% | 54 ppm |
| 15% | 7.5 ppm |

TABLE A-1-continued

| a (LiNiO$_2$ Mixing Ratio) | Mn Concentration in Electrolyte solution |
|---|---|
| 20% | 1.9 ppm |
| 30% | <0.2 ppm |
| 35% | <0.2 ppm |
| 35%, but LiMn$_{1.8}$Ni$_{0.2}$O$_4$ | 2400 ppm |

(In Table A-1, "a" is the same meaning as the above, namely, it represents a mixing weight ratio of the lithium-nickel composite oxide when [lithium-manganese composite oxide]:[lithium-nickel composite oxide] is represented by (100−a):a.)

It is apparent from this result that an amount of Mn eluted into the electrolyte solution is small as the mixing ratio of LiNiO$_2$ is higher. That is, even if the battery is used under the high temperature environment, it can be expected that stability of the positive electrode material increases. In particular, if LiNiO$_2$ of less than 3% is added, the effect for suppressing elution of Mn can be observed. However, addition of not less than 3% is preferable in order to obtain the satisfactory effect. More preferably, more than 10% should be added.

Further, the spinel type lithium-nickel composite oxide containing Mn was used, effect for suppressing elution of Mn was not observed.

Evaluation Test Example A-2

The sealed containers prepared in the evaluation test example A-1 were similarly heated at 80° C. and left for 20 days. Thereafter, the electrolyte solution was extracted, and the Li ion concentration in the electrolyte solution was analyzed by atomic absorption. The result is shown in Table A-2.

TABLE A-2

| a (LiNiO$_2$ Mixing Ratio) | Li Concentration in Electrolyte solution |
|---|---|
| 0% | 5577 ppm |
| 2% | 5617 ppm |
| 3% | 6323 ppm |
| 5% | 6364 ppm |
| 10% | 6402 ppm |
| 15% | 6418 ppm |
| 30% | 6420 ppm |
| 35% | 6422 ppm |
| 35%, LiMn$_{1.8}$Ni$_{0.2}$O$_4$ is used | 5400 ppm |

(In this table, a is synonymous with that in Table A-1.)

Taking into consideration that the Li concentration in the electrolyte solution of the mixed solvent (50:50 (volume %)) obtained from propylene carbonate (PC) and dimethyl carbonate (DMC) containing LiPF$_6$ (concentration: 1M) is approximately 6400 ppm, it can be said that when the mixing ratio of LiNiO$_2$ is not less than 3%, reduction in Li concentration in the electrolyte solution can be suppressed. Acceptable Mn concentration in the electrolyte solution is considered to be ⅓ or less of that of the case when the lithium-nickel composite oxide is not mixed. Therefore, "a" of not less than 3 is preferable in view of suppression of reduction in Li concentration in the electrolyte solution.

Moreover, when the spinel type lithium-nickel composite oxide containing Mn was used, the effect for suppressing reduction in Li concentration was not observed.

Evaluation Test Example A-3

As a lithium-manganese composite oxide, lithium manganate which was synthesized by the same procedure as in the evaluation text example A-1 was used. As a lithium-nickel composite oxide, there were prepared seven kinds of LiNi$_{0.8}$Co$_{0.2}$O$_2$ powder, i.e., 3.0 m$^2$/g, 2.36 m$^2$/g, 1.50 m$^2$/g, 0.71 m$^2$/g, 0.49 m$^2$/g, 0.30 m$^2$/g, and 0.25 m$^2$/g.

Subsequently, lithium manganate and LiNi$_{0.8}$Co$_{0.2}$O$_2$ having various specific surface areas were mixed at a predetermined mixing weight ratio (a=0, 3, 5, 10, 15, 20, 30, 35). 5 g of the above mixed powder and 10 cc of the electrolyte solution of the mixed solved (50:50 (volume %)) obtained from propylene carbonate (PC) and dimethyl carbonate (DMC) containing LiPF$_6$ (concentration: 1M) was put in sealed containers.

Figure 1:
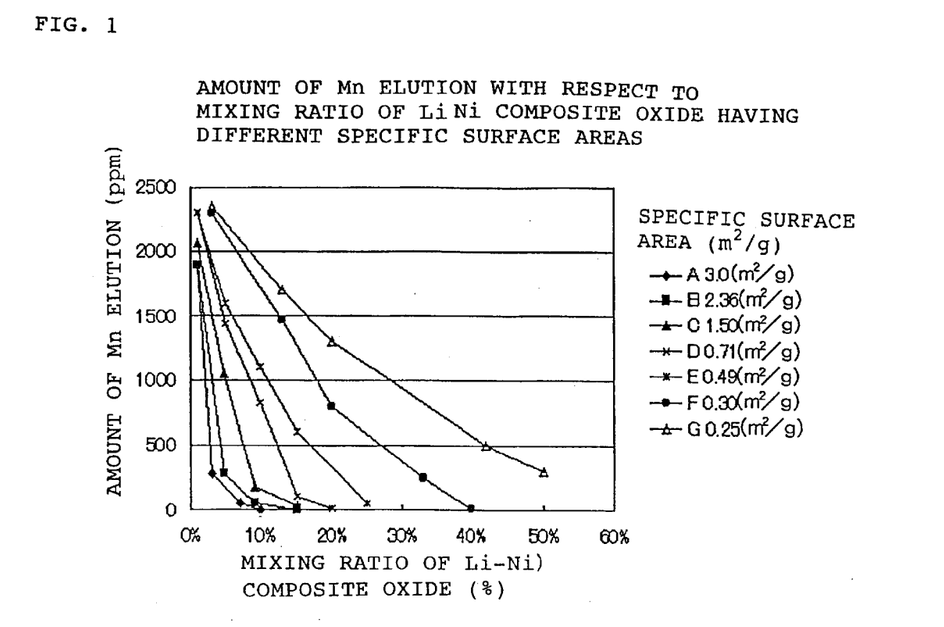
FIG. 1 is a graph showing a result of measuring an Mn concentration in an electrolyte solution by changing a mixing ratio and a specific surface area of a lithium-nickel composite oxide in case of 20-day immersion in the electrolyte solution of 80° C.

These containers were heated at 800C and left for 20 days. Thereafter, the electrolyte solution was extracted, and Mn ion concentration in the electrolyte solution was analyzed by ICP. The result is shown in FIG. 1. It is apparent that the effect for suppression elution of Mn is high as the specific surface area is large.

It is found from the result of the evaluation test example A-3 that the effect for suppressing elution of Mn is too small when the specific surface area of lithium-nickel composite oxide is less than 0.3 m$^2$/g, and only a>45 can achieve the ⅓ or less of Mn concentration in cases where no lithium-nickel composite oxide is not mixed. Therefore, it is understood that a specific surface area of not less than 0.3 m$^2$/g is preferable.

Evaluation Test Example A-4

As a lithium-manganese composite oxide, lithium manganate synthesized by the same procedure as in the evaluation test example A-1 was used. As a lithium-nickel composite oxide, six kinds of LiNi$_{0.8}$Co$_{0.2}$O$_2$ powder having D$_{50}$ of 2 μm, 3 μm, 15 μm, 26 μm, 40 μm and 45 μm were prepared.

Subsequently, lithium manganate and LiNi$_{0.8}$Co$_{0.2}$O$_2$ having various specific surface areas were mixed at a predetermined mixing weight ratio (i.e., a=0, 3, 5, 10, 15, 20, 30, 35). Furthermore, as similar to the evaluation text example A-1. 5 g of the above mixed powder and 10 cc of the electrolyte solution of the mixed solvent (50:50 (volume %)) obtained from propylene carbonate (PC) and dimethyl carbonate (DMC) containing LiPF$_6$ (concentration: 1M) was put into sealed containers.

Figure 2:
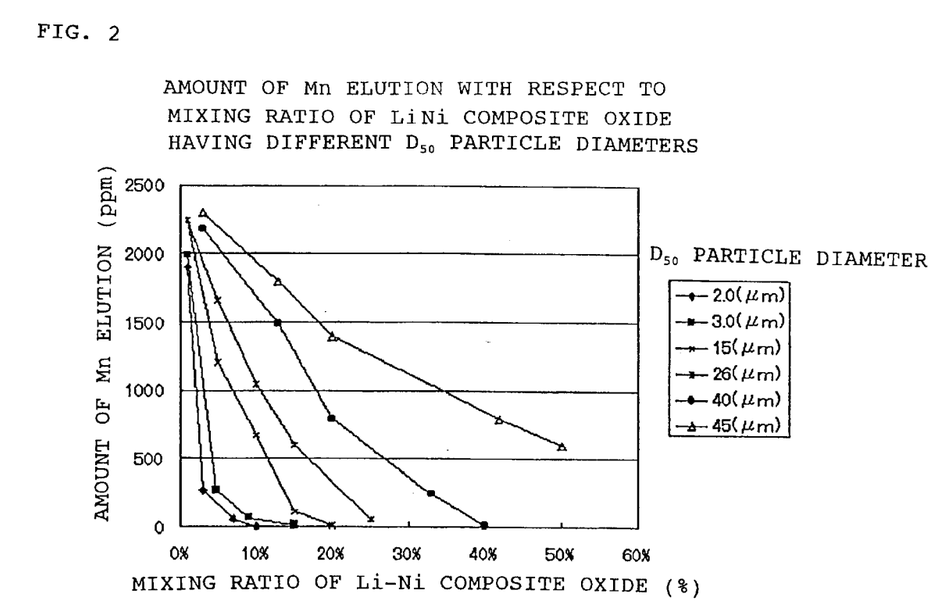
FIG. 2 is a graph showing a result of measuring an Mn concentration in an electrolyte solution by changing a mixing ratio and $D_{50}$ of a lithium-nickel composite oxide in case of 20-day immersion in the electrolyte solution of 80° C.

These sealed containers were heated at 80° C. and left for 20 days. Thereafter, the electrolyte solution was extracted, and Mn ion concentration in the electrolyte solution was analyzed by ICP. The result is shown in FIG. 2. It is found that the effect for suppression elution of Mn is higher as the particle diameter is smaller. Further, If the mixing ratio a of the lithium-nickel composite oxide having a D$_{50}$ particle diameter of more than 40 μm is set so that a>45, an amount of Mn elution cannot be less than ⅓ of the Mn concentration obtained when no lithium-nickel composite oxide is not mixed. Therefore a D$_{50}$ particle diameter of not more than 40 μM is preferable.

Evaluation Test Example A-5

As a lithium-manganese composite oxide, lithium manganate synthesized by the same procedure as in the evaluation test example A-1 was used. As a lithium-nickel composite oxide, five kinds of LiNi$_{0.8}$Co$_{0.2}$O$_2$ powder having the specific surface areas of 4.5 m$^2$/g, 3.2 m$^2$/g, 3.0 m$^2$/g, 1.50 m$^2$/g and 0.30 m$^2$/g were prepared. Lithium manganate, LiNi$_{0.8}$Co$_{0.2}$O$_2$, and carbon black as conductivity-enhancing agent were dry-blended, and the obtained material was added into N-methyl-2-pyrrolidone (NMP) in which PVDF as a binder is dissolved. They are kneaded and evenly dispersed to produce slurry for a battery. At this time, the mixing ratio (a=25) of lithium manganate:LiNi$_{0.8}$Co$_{0.2}$O$_2$:a conductivity-enhancing agent:PVDF:NMP=30:10:5:5:50 was used.

After measurement using a Brookfield viscometer, the slurry was applied onto an aluminum foil having a thickness of 25 μm, and NMP was then evaporated to obtain a positive electrode sheet. Table A-3 shows the specific surface area, the slurry and the state of coat.

TABLE A-3

| Specific Surface Area (m$^2$/g) | Viscosity | State of Slurry | State of Coating Electrode |
| --- | --- | --- | --- |
| 4.5 | 22,000 | Gelled | Poor |
| 3.2 | 18,000 | Gelled | Poor |
| 3.0 | 6,000 | Uniformly Dispersed | Good |
| 1.50 | 5,000 | Uniformly Dispersed | Good |
| 0.30 | 4,000 | Uniformly Dispersed | Good |

It is understood from Table A-3 that gelation occurs and electrode coating becomes difficult when the specific surface area is larger than 3.0 m$^2$/g, and a specific surface area of not more than 3.0 m$^2$/g is preferable.

Evaluation Text Example A-6

The preparation similar to that in the evaluation A-5 was made except that LiNi$_{0.8}$Co$_{0.2}$O$_2$ powder having D$_{50}$ of 2 μm, 3 μm, 15 μm, 26 μm, 40 μm and 45 μm was prepared as a lithium-nickel composite oxide, thereby providing a positive electrode sheet. Table A-4 shows the D$_{50}$ particle diameter, the slurry and the state of coating.

TABLE A-4

| D$_{50}$ (μm) | Viscosity | Slurry State | State of Coating Electrode |
| --- | --- | --- | --- |
| 2 | 22,000 | Gelled | Poor |
| 3 | 8,000 | Uniformly Dispersed | Good |
| 15 | 6,000 | Uniformly Dispersed | Good |
| 26 | 5,000 | Uniformly Dispersed | Good |
| 40 | 4,000 | Uniformly Dispersed | Good |
| 45 | 3,800 | Uniformly Dispersed | Good |

It can be understood from Table A-4 that occurrence of gelation makes it difficult to coat the electrode when the D$_{50}$ particle diameter is less than 3 μm, and a D$_{50}$ particle diameter of not less than 3 μm is preferable.

Evaluation Test Example A-7

As a lithium-manganese composite oxide, lithium manganate synthesized by the same procedure as in the evaluation test example A-1 was used. As a lithium-nickel composite oxide, LiNi$_{0.8}$Co$_{0.2}$O$_2$ having a specific surface area of 1.7 m$^2$/g was used to produce 2320 coin cells. That is, a mixture obtained by kneading the following materials in a mixing ratio (a=10) of lithium manganate:LiNi$_{0.8}$Co$_{0.2}$O$_2$:conductivity-enhancing agent:PTFE=72:8:10:10 (weight %) was rolled to a thickness of 0.5 mm and then punched out at φ12 mm to manufacture the positive electrode. Here, carbon black was used as the conductivity-enhancing agent. A metal Li having φ14 mm and a thickness of 1.5 mm was used for a negative electrode, and a porous PP film having a thickness of 25 μm was used for a separator. As an electrolyte solution, a mixed solvent [50:50 (volume %)] of ethylene carbonate (EC) and dimethyl carbonate containing LiClO$_4$ (concentration: 1M) was used.

Simultaneously for comparison, the same procedure as in the foregoing example was conducted similarly using the negative electrode, the separator and the electrolyte solution except that lithium manganate:conductivity-enhancing agent:PTFE=80:10:10 (weight %) was used as the positive electrode and LiNi$_{0.8}$Co$_{0.2}$O$_2$ was not contained therein, thereby producing 2320 coin cells.

Charge and discharge cycle tests were carried out by using these coin cells. A constant current of 0.5 mA/cm$^2$ and a charge and discharge voltage range of 3.0 to 4.5 V vs Li were used to effect the cycle for both charge and discharge. Further, evaluation temperatures of 10° C. to 60° C. were used in increments of 10° C.

Table A-5 shows a #50/#1 (i.e., ratio of a discharge capacity in the 50th cycle to a discharge capacity in the first cycle) capacity remaining ratio (%) at the cycle evaluation temperature of the coin cell which contains LiNi$_{0.8}$Co$_{0.2}$O$_2$ (an example) and the coin cell which does not contain LiNi$_{0.8}$C)$_{0.2}$O$_2$ (a comparative example). The coin cell according to the present invention has the higher capacity remaining ratio even if the cycle temperature is raised.

TABLE A-5

| | #50/#1 Capacity Remaining Ratio (%) | |
| --- | --- | --- |
| Cycle Evaluation Temperature (° C.) | Example | Comparative Example |
| 10 | 94 | 92 |
| 20 | 93 | 91 |
| 30 | 92 | 88 |
| 40 | 91 | 84 |
| 50 | 89 | 76 |
| 60 | 89 | 73 |

Evaluation Test Example A-8

As a lithium-manganese composite oxide, lithium manganate synthesized by the same procedure as in the evaluation test example A-1 was used. Further, as a lithium-nickel composite oxide, LiNi$_{0.8}$Co$_{0.2}$O$_2$ having a specific surface area of 1.7 m$^2$/g was used to produce 18650 cylindrical cells as samples. That is, lithium manganese, LiNi$_{0.8}$Co$_{0.2}$O$_2$ and carbon black as a conductivity-enhancing agent were first dry-mixed, and the resultant mixture was then uniformly dispersed in N-methyl-2-pyrrolidone (NMP) in which PVDF as a binder was dissolved, thereby producing a slurry. After applying the slurry onto an aluminum foil having a thickness of 25 μm, NMP was evaporated to produce a positive electrode sheet. A solid content ratio in the positive electrode was lithium manganate:LiNi$_{0.8}$Co$_{0.2}$O$_2$:conductivity-enhancing agent:PVDF=72:8:10:10 (weight %). In this case, "a"=10.

On the other hand, a negative electrode sheet was formed by mixing carbon with PVDF in a ratio of carbon:PVDF=90:10 (weight %), dispersing the mixture in the NMP, and then applying the dispersion onto a copper foil having a thickness of 20 μm.

The thus manufactured electrode sheets for the positive and negative electrodes were rolled up while interposing a polyethylene porous film separator having a thickness of 25 µm therebetween, thereby producing a cylindrical battery.

As base electrolyte salt, $LiPF_6$ (1M) was used and a mixed solvent [50:50 (volume %)] of propylene carbonate (PC) and diethyl carbonate (PC) was used as a solvent to give electrolyte solution.

Simultaneously for comparison, the same procedure as in the above example was conducted except that $LiNi_{0.8}Co_{0.2}O_2$ was not contained and a solid content ratio was lithium manganese:a conductivity-enhancing agent:PVDF=80:10:10 (weight %), thereby manufacturing 18650 cylindrical cells as samples.

Figure 3:
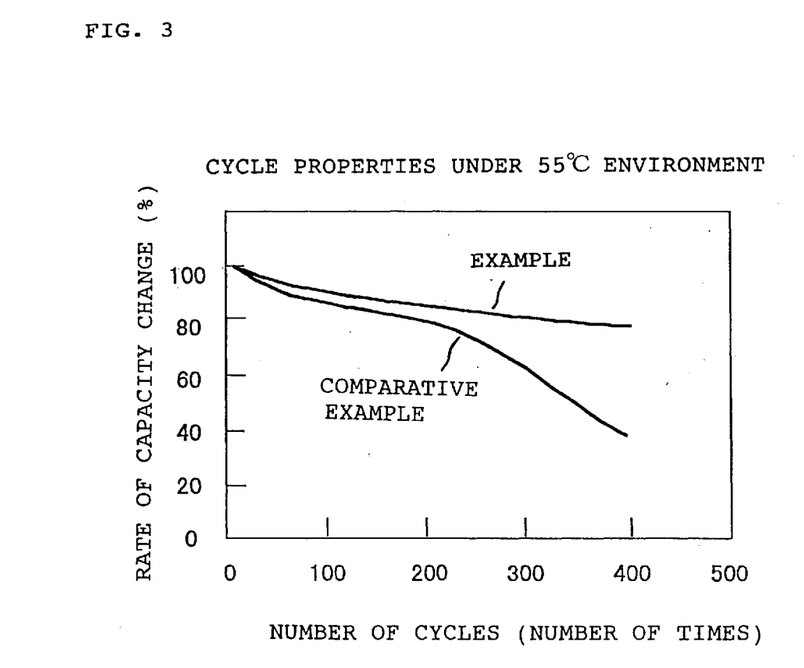
FIG. 3 is a view showing cycle properties of a discharge capacity of a cylinder cell according to the present invention and the prior art at 55° C.

Charge and discharge cycle tests at 55° C. were carried out by using these cylindrical cells. Charging was effected at 500 mA up to 4.2 V, and discharging was performed at 1000 mA up to 3.0 V. FIG. 3 shows the comparison of the cycle properties of the charge and discharge capacity of the cylindrical cell at 55° C. in a case where $LiNi_{0.8}Co_{0.2}O_2$ was contained (an example) and a case where the same was not contained (a comparative example). It can be understood that the cylindrical cell according to the example of the present invention can reduce capacity deterioration when the charge and discharge cycle is repeated.

Figure 4:
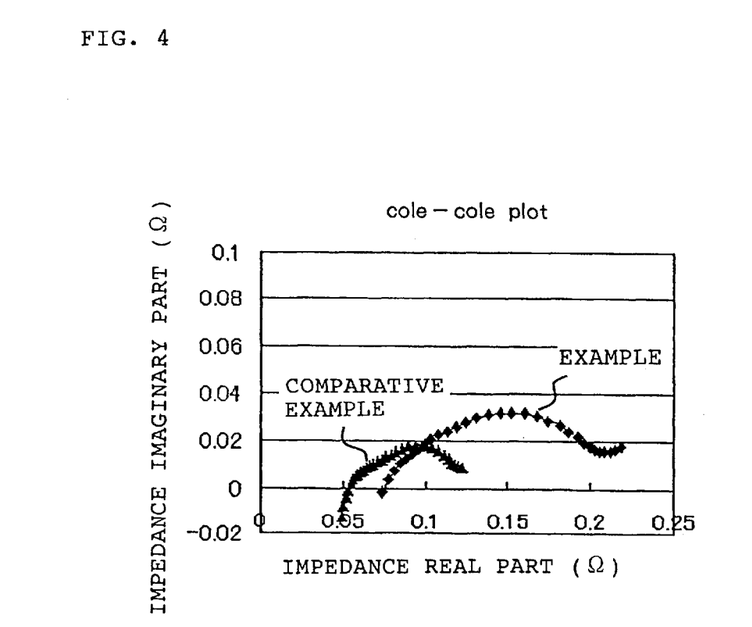
FIG. 4 is a view showing impedance of the cylinder cell according to the present invention and the prior art.

Further, after performing 100 cycles of the charge and discharge cycle tests at 55° C. by using the cylindrical cells according to the above example and comparative example, an impedance of each cylindrical cell was measured by an alternating impedance measuring method. FIG. 4 shows the comparison of the impedances. It is apparent that the example according to the present invention can provide a smaller direct-current equivalent resistance and boundary resistance.

Evaluation Test Example A-9

Lithium manganese synthesized by the same procedure as in the evaluation test example A-1 was used as a lithium-manganese composite oxide, and $LiNi_{0.8}Co_{0.2}O_2$ having a specific surface area of 1.7 m²/g was used as a lithium-nickel composite oxide to produce 18650 cylindrical cells as samples. 18650 cylindrical cells were manufactured by the same procedure as in the evaluation text example A-8.

In this evaluation text example, a solid content weight ratio in the positive electrode was obtained by carrying out tests in accordance with values of x (weight %), shown in Table A-6, in lithium manganese:$LiNi_{0.8}Co_{0.2}O_2$:a conductivity-enhancing agent:PVDF=80–x:x:10:10. Table A-6 also shows values of "a" (=x·100/80, which is synonymous with a in the foregoing examples).

Capacity holding tests at 55° C. were carried out by using the thus manufactured cylindrical cells.

In regard to electrical charge, constant current charge at 500 mA up to 4.2 V was carried out, and constant voltage charge at 4.2 V was then performed for two hours. Thereafter, a discharge capacity obtained by discharging at room temperature without allowing the lapse of time and that obtained by discharging after allowing the cell to stand at room temperature for 28 days were respectively measured. For the capacity measurement, 500 mA and a cutoff potential of 3.0 V were used in the room temperature environment.

Table A-6 shows the holding capacity of the manufactured cylindrical cell after allowing the cell to stand for 28 days (denoted as the capacity 4 W) and the percentage of the above holding capacity to the capacity obtained by discharging without allowing the lapse of time (denoted as the capacity 0 W). When $LiNi_{0.8}Co_{0.2}O_2$ is added, the capacity retention stability is higher even after the cell has been allowed to stand for 28 days, as compared with a case where $LiN_{0.8}Co_{0.2}O_2$ is not added (x=0). Further, a mixing effect of a high capacity lithium-nickel composite oxide contributed to increase in the capacity of the cylindrical cell.

TABLE A-6

| x | a | Capacity 4W (mAh) | Capacity 4W/ Capacity 0W (%) |
|---|---|---|---|
| 0 | 0 | 1205 | 83 |
| 4 | 5 | 1393 | 93 |
| 8 | 10 | 1452 | 94 |
| 12 | 15 | 1511 | 94 |
| 16 | 20 | 1554 | 95 |
| 20 | 25 | 1598 | 95 |
| 24 | 30 | 1642 | 95 |
| 28 | 35 | 1686 | 95 |
| 32 | 40 | 1748 | 96 |
| 35 | 43.8 | 1774 | 95 |
| 37 | 46.3 | 1818 | 95 |
| 44 | 55 | 1862 | 96 |
| 48 | 60 | 1906 | 95 |
| 52 | 65 | 1949 | 95 |
| 56 | 70 | 1993 | 95 |

Evaluation Text Example A-10

Safety tests were performed by using the cylindrical cells manufactured in the evaluation test example A-9. Table A-7 shows its result. When lithium manganate was used as a main positive electrode active material, since the safety becomes higher than that in the Co system, round bar collapse test and nailing test were adopted as safety evaluation items in order to emphasize differences in safety under strict conditions.

In the round bar collapse test, the battery was collapsed to ½ by using a round bar. Further, the nailing test forcibly causes the internal short circuit by piercing the battery with a nail, and a 4 mm nail was used. In each test, the detail complied with UL-1642.

In the round bar collapse test, a small amount of steam was observed when x was not less than 40, and ignition occurred when x was not less than 52. On the other hand, in the nailing test, smoke was emitted when x was in excess of 36, and ignition occurred when x was not less than 48. It becomes difficult to assure the safety as the ratio of the lithium-nickel composite oxide increases. From the viewpoint of the safety, therefore, x should be not more than 36, naimly, $a \leq 45$ should be satisfied.

TABLE A-7

| x | a | Round Bar Collapse Test | Nailing Test |
|---|---|---|---|
| 0 | 0 | No Smoking/Ignition | No Smoking/Ignition |
| 4 | 5 | No Smoking/Ignition | No Smoking/Ignition |
| 8 | 10 | No Smoking/Ignition | No Smoking/Ignition |
| 12 | 15 | No Smoking/Ignition | No Smoking/Ignition |
| 16 | 20 | No Smoking/Ignition | No Smoking/Ignition |
| 20 | 25 | No Smoking/Ignition | No Smoking/Ignition |
| 24 | 30 | No Smoking/Ignition | No Smoking/Ignition |
| 28 | 35 | No Smoking/Ignition | No Smoking/Ignition |
| 32 | 40 | No Smoking/Ignition | No Smoking/Ignition |
| 35 | 43.8 | No Smoking/Ignition | Small Amount of Steam |
| 37 | 46.3 | Small Amount of Steam | Smoking |
| 44 | 55 | Small Amount of Steam - Smoking | Smoking |
| 48 | 60 | Smoking | Ignition |

TABLE A-7-continued

| x | a | Round Bar Collapse Test | Nailing Test |
|---|---|---|---|
| 52 | 65 | Ignition | Ignition |
| 56 | 70 | Ignition | Ignition |

Summarizing the results of the above-described evaluation test examples, the mixed lithium-nickel composite oxide having the specific surface area X in a range of $0.3 \leq X \leq 3.0$ (m²/g) is most suitable in view of Mn elution and of coating and printing properties of the slurry.

Further, the mixed lithium-nickel composite oxide having the $D_{50}$ particle diameter which is not less than 3 μm and not more than 40 μm is most suitable in view of Mn elution and of coating and printing properties of the slurry.

Additionally, as a ratio between a lithium-manganese composite oxide and the lithium-nickel composite oxide, $3 \leq a \leq 45$ is preferable in view of Mn elution and of safety provided that [Li—Mn composite oxide]:[Li—Ni composite oxide]=(100−a):a.

Evaluation Test Example B-1

Lithium carbonate ($Li_2CO_3$) and electrolytic manganese dioxide (EMD) were used as starting materials for synthesization of lithium manganate.

As a preliminary step toward mixture of these starting materials, pulverization of $Li_2CO_3$ and classification of EMD were performed in order to improve reactivity and obtain lithium manganate having a target particle diameter. When lithium manganate is used s a positive electrode active material for the battery, since the weight average particle diameter of 5 to 30 μm is preferable in view of assuring uniformity of reaction, easiness of slurry production, safety and others, the particle diameter of EMD was also determined as 5 t 30 μm equal to the target particle diameter of lithium manganate.

On the other hand, as to $Li_2CO_3$, since the particle diameter of not more than 5 μm is desirable for assuring the uniform reaction, pulverization was performed so that the $D_{50}$ particle diameter can be 1.4 μm.

EMD and $Li_2CO_3$ whose particle diameters were adjusted to a predetermined size were mixed so that [Li]/[Mn]=1.05/2 can be obtained.

The mixed powder was baked in the oxygen flow atmosphere at 800° C. Subsequently, the fine particles having the particle diameter of not more than 1 μm in the obtained lithium manganate particles were removed by an air classifier. At this time, the specific surface area of the obtained lithium manganate was approximately 0.9 m²/g.

Further, the obtained fine particle characteristic has a tap density of 2.17 g/cc, a true density of 4.09 g/cc, a $D_{50}$ particle diameter of 17.2 μm and a crystal lattice constant of 8.227 Å.

On the other hand, $LiNi_{0.8}Co_{0.2}O_2$ having a specific surface area of 1.7 m²/g was prepared for hydrogen ion capturing agent as an example of the lithium-nickel composite oxide.

Lithium manganate and $LiNi_{0.9}Co_{0.1}O_2$ prepared as described above were mixed so that a=0 (a comparative example), 1, 2, 3, 5, 10, 15 and 20 can be obtained when they are expressed as 100−a:a. Further, 5 g of the mixed powder and 10 cc of the electrolyte solution of the mixed solvent (50:50 (volume %)) obtained from propylene carbonate (PC) and dimethyl carbonate (DMC) containing $LiPF_6$ (concentration: 1M) were put into sealed containers.

These sealed containers were heated at 80° C. and left for 20 days. Thereafter, the electrolyte solution was extracted, and Mn ion concentration in the electrolyte solution was analyzed by ICP. Table B-1 shows its result.

TABLE B-1

Mn Concentration in Electrolyte solution

| | a<br>Mixing Ratio of<br>$LiNi_{0.9}Co_{0.1}O_2$ | Mn Concentration in<br>Electrolyte solution |
|---|---|---|
| Example | 1% | 1901 ppm |
| | 2% | 1797 ppm |
| | 3% | 623 ppm |
| | 5% | 519 ppm |
| | 10% | 23 ppm |
| | 15% | 4.2 ppm |
| | 20% | Not More Than 0.2 ppm |
| Comparative Example | 0% | 2320 ppm |

It is apparent from the result that an amount of Mn eluted into the electrolyte solution becomes smaller as the mixing ratio of $LiNi_{0.9}Co_{0.1}O_2$ is higher, which leads to the high effect for capturing the hydrogen ion. As described above, stability of the positive electrode active material can increase even if the battery is used in the high temperature environment.

Evaluation Test Example B-2

The sealed containers prepared in the evaluation test examples B-1 were heated at 80° C. and left for 20 days. Thereafter, the electrolyte solution was extracted, and Li ion concentration in the electrolyte solution was analyzed by atomic absorption. Table B-2 shows its result.

TABLE B-2

Li Concentration in Electrolyte solution

| | a<br>Mixing Ratio of<br>$LiNi_{0.9}Co_{0.1}O_2$ | Li Concentration<br>in Electrolyte solution |
|---|---|---|
| Example | 1% | 5572 ppm |
| | 2% | 5610 ppm |
| | 3% | 6372 ppm |
| | 5% | 6364 ppm |
| | 10% | 6402 ppm |
| | 15% | 6418 ppm |
| | 20% | 6397 ppm |
| Comparative Example | 0% | 5577 ppm |

Taking into consideration that the Li concentration in the electrolyte solution of the mixed solvent (50:50 (volume %)) obtained from propylene carbonate (PC) and dimethyl carbonate (DMC) containing $LiPF_6$ (concentration: 1M) is approximately 6400 ppm, it can be said that reduction in the Li concentration in the electrolyte solution can be suppressed as the mixing ratio of $LiNi_{0.9}Co_{0.1}O_2$ increases.

It was found from the results of the evaluation test examples B-1 and 2 that mixture of the lithium-nickel composite oxide can reduce Mn elution into the electrolyte solution to thereby suppress changes in the Li ion concentration in the electrolyte solution. Acceptable Mn concentration in the electrolyte solution is considered to be ⅓ or less of that of the case where the lithium-nickel composite oxide is not mixed. The mixing ratio of the lithium-nickel composite oxide is preferably $a \geq 23$ provided that [lithium-manganese composite oxide]:[lithium-nickel composite oxide]=100:a (weight %). Further, in case of a≧3 from the evaluation test example B-2, it is understood that 95% or above of the Li concentration in the electrolyte solution is maintained after being left for 20 days at 80° C. From these results, a≧23 is particularly preferable.

Evaluation Text Example B-3

Lithium manganate synthesized as in the evaluation text example B-1 was used as a lithium-manganese composite oxide and $LiNi_{0.8}Co_{0.2}O_2$ having a specific surface area of 1.7 $m^2/g$ was used as a lithium-nickel composite oxide to produce 2320 coin cells. A mixture obtained by kneading the following materials in a mixing ratio (a=10) of lithium manganate:$LiNi_{0.8}Co_{0.2}O_2$:a conductivity-enhancing agent:PTFE=72:8:10:10 (weight %) was rolled to a thickness of 0.5 mm and then punched out at φ12 mm. The resultant product was used as the positive electrode. Carbon black was used as the conductivity-enhancing agent. A metal Li having φ14 mm and a thickness of 1.5 mm was used as the negative electrode, and a porous PP film having a thickness of 25 μm was used as the separator. The mixed solvent (50:50 (volume %)) obtained from ethylene carbonate (EC) and dimethyl carbonate containing $LiBF_4$ (concentration: 1M) was used for the electrolyte solution.

At the same time, except that the mixing ratio in the positive electrode was determined as lithium manganate:a conductivity-enhancing agent:PTFE=80:10:10 (weight %) and $LiNi_{0.8}Co_{0.2}O_2$ was not contained, the negative electrode, the separator and the electrolyte solution similar to those in the foregoing example were used to produce 2320 coin cells (a comparative example).

These coin cells were used to perform the charge and discharge cycle tests. A constant current of 0.5 $mA/cm^2$ and the charge and discharge voltage range of 3.0 to 4.5 V vs Li were used to effect the cycle for both charge and discharge. Further, the evaluation temperature of 10° C. to 60° C. was used in increments of 10° C.

Table B-3 shows the #50/#1 (the ratio of the discharge capacity in the 50th cycle to the discharge ratio in the 1st cycle) capacity remaining ratio (%) of the coin cell which contains $LiNi_{0.8}Co_{0.2}O_2$ (an example) and the coin cell which does not contain the same (a comparative example) using the cycle evaluation temperatures. The coin cell according to the present invention has the higher capacity remaining ratio even if the cycle temperature is increased.

TABLE B-3

50/#1 Capacity Remaining Ratio (%)

| Cycle Evaluation Temperature (° C.) | #50/#1 Capacity Remaining Ratio (%) | |
| --- | --- | --- |
| | Example | Comparative Example |
| 10 | 94 | 92 |
| 20 | 93 | 91 |
| 30 | 92 | 88 |
| 40 | 91 | 84 |
| 50 | 89 | 76 |
| 60 | 89 | 73 |

Evaluation Test Example B-4

Lithium manganate synthesized by the same procedure as in the evaluation text example B-1 was used as a lithium-manganese composite oxide, and $LiNi_{0.8}Co_{0.2}O_2$ having a specific surface area of 1.7 $m^2/g$ was used as a lithium-nickel composite oxide in order to produce 18650 cylindrical cells.

Lithium manganate, $LiNi_{0.8}Co_{0.2}O_2$ and the conductivity-enhancing agent were first dry-mixed and uniformly dispersed into N-methyl-2-pyrrolidone (NMP) in which PVDF as a binder was dissolved to produce the slurry. Carbon black was used as the conductivity-enhancing agent. After applying the slurry onto an aluminum foil having a thickness of 25 μm, NMP was evaporated to obtained a positive sheet. The solid content ratio in the positive electrode was determined as a mixing ratio (a=10) of lithium manganate:$LiNi_{0.8}Co_{0.2}O_2$:conductivity-enhancing agent:PVDF=72:8:10:10 (weight %).

On the other hand, mixing was carried out so that the ratio of carbon:PVDF=90:10 (weight %) can be obtained and the resultant material was dispersed into NMP. Further, it was applied onto copper foil having a thickness of 20 μm to manufacture a negative electrode sheet.

The thus produced electrode sheets for the positive and negative electrodes were rolled up while interposing a polyethylene porous separator having a thickness of 25 μm therebetween, to obtain cylindrical batteries.

As to the electrolyte solution, 1M $LiPF_6$ was used as the base electrolyte salt, and the mixed solvent [50:50 (volume %)] obtained from propylene carbonate (PC) and diethyl carbonate (DEC) was used as the solvent.

At the same time, except that $LiNi_{0.8}Co_{0.2}O_2$ was not contained in the positive electrode and the solid content ratio was determined as lithium manganate:a conductivity-enhancing agent:PVDF=80:10:10 (weight %), the similar processes were used to manufacture 18650 cylindrical cells by way of trial for comparison (a comparative example).

Figure 5:
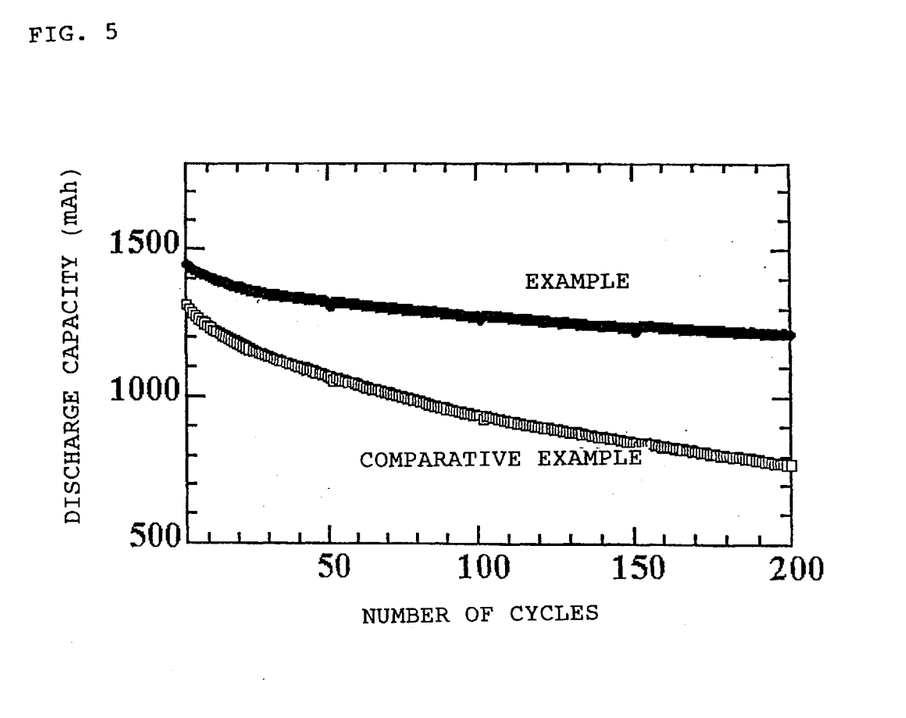
FIG. 5 is a view showing a discharge capacity and cycle properties of a cylinder cell according to an example of the present invention and a comparative example at 55° C.

Charge and discharge cycle tests were carried out at 55° C. by using these cylindrical cells. Charge was effected at 500 mA up to 4.2 V and discharge was performed at 1000 mA up to 3.0 V. FIG. 5 shows the cycle characteristic comparison of the discharge capacity of the cylindrical cells at 55° C. in cases where $LiNi_{0.8}Co_{0.2}O_2$ is contained (an example) and where the same is not contained (a comparative example). It is understood that the cylindrical cell according to the example of the present invention has less capacity deterioration even if the charge and discharge cycle is repeated.

Evaluation Test Example B-5

Figure 6:
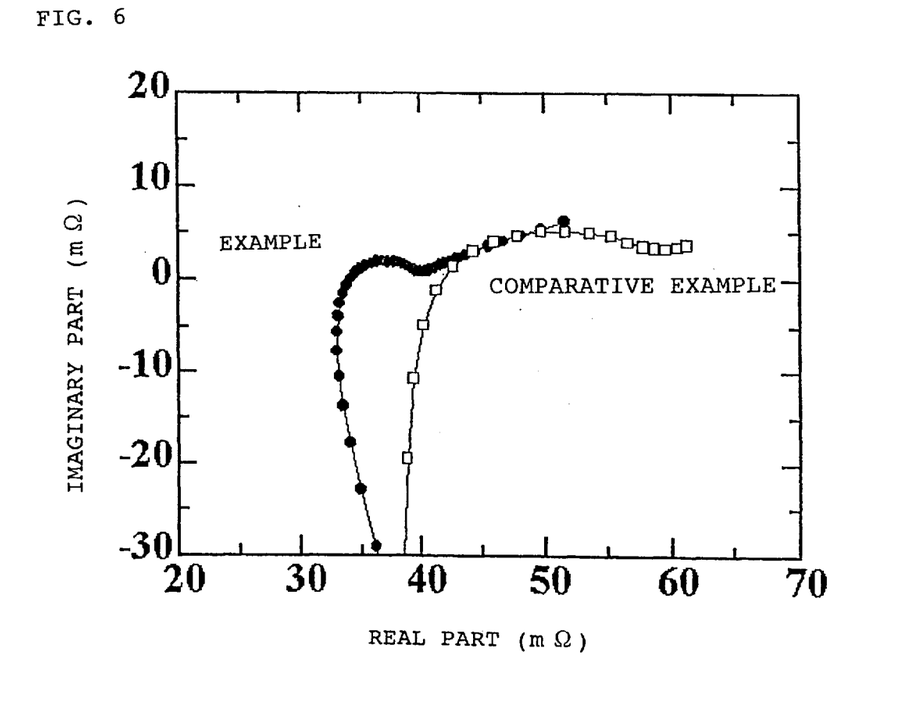
FIG. 6 is a view showing impedance of a cylinder cell according to the example of the present invention and the comparative example.

After effecting 100 cycles of the charge and discharge cycle tests at 55° C. by using the cylindrical cells manufactured in the evaluation test example B-4, the impedance of each cylindrical cell was measured by the alternating impedance method. FIG. 6 shows its comparison. It can be found that the example according to the present invention have the smaller direct-current equivalent resistance and boundary resistance.

Evaluation Test Example B-6

Lithium manganate synthesized by the same procedure as in the evaluation text example B-1 was used as a lithium-manganese composite oxide and the lithium-nickel composite oxide $LiNi_{0.8}Co_{0.15}Al_{0.15}O_2$ having the specific surface area 1.7 $m^2/g$ was used as the hydrogen ion capturing agent to manufacture 18650 cylindrical cells by way of trial.

Lithium manganate, $LiNi_{0.8}Co_{0.15}Al_{0.05}O_2$ and the conductivity-enhancing agent were first dry-mixed and uniformly dispersed into N-methyl-2-pyrrolidone (NMP) in which PVDF as a binder was dissolved to produce the slurry. After applying the slurry onto an aluminum foil having a thickness of 25 µm, NMP was evaporated to obtain a positive electrode sheet.

A solid content ratio in the positive electrode was obtained by carrying out tests in accordance with values of x (weight %), shown in Table B-4, in lithium manganate: $LiNi_{0.8}Co_{0.15}Al_{0.15}O_2$ a conductivity-enhancing agent:PVDF=80−x:x:10:10 in terms of weight %. Table B-4 also shows values of "a" (=x·100/80, which is the same meaning as the foregoing example). As a comparative example, the test in the case of x=0 (a=0) was also carried out.

On the other hand, a negative electrode sheet was formed by mixing carbon with PVDF in a ratio of carbon:PVDF= 90:10 (weight %), dispersing the mixture in the NMP, and then applying the dispersion onto a copper foil having a thickness of 20 µm.

As to the electrolyte solution, $LiPF_6$ was used as the base electrolyte salt, and the mixed solvent [50:50 (volume %)] obtained from propylene carbonate (PC) and diethyl carbonate (DEC) was used. Polyethylene porous film having a thickness of 25 µm was used as a separator.

Capacity retention tests at 55° C. were carried out by using the thus manufactured cylindrical cells. Constant current charge was carried out at 500 mA up to 4.2 V, and constant voltage discharge was then performed at 4.2 V for two hours. Thereafter, a discharge capacity obtained by discharging at room temperature without allowing the lapse of time and that obtained by discharging at room temperature after allowing the cell to stand for 28 days were measured. The capacity was measured in the room temperature environment at 500 mA with a cutoff potential of 3.0 V.

Table B-4 shows the retained capacity (noted as the capacity 4 W) of the trial cylindrical cell obtained after being left for 28 days and a percentage of the above retained capacity to the capacity (noted as the capacity 0W) obtained by discharging without being left. The example according to the present invention can still have the higher retention stability than the comparative example even after being left for 28 days. Further, the effect of mixing the high capacity lithium-nickel composite oxide also increased the capacity of the cylindrical cell.

TABLE B-4

|  | x | a | Capacity 4W (mAh) | Capacity 4W/Capacity 0W (%) |
|---|---|---|---|---|
| Example | 4 | 5 | 1383 | 93 |
|  | 8 | 10 | 1442 | 94 |
|  | 12 | 15 | 1501 | 94 |
|  | 16 | 20 | 1544 | 95 |
|  | 20 | 25 | 1588 | 95 |
|  | 24 | 30 | 1632 | 95 |
|  | 28 | 35 | 1676 | 95 |
|  | 32 | 40 | 1738 | 96 |
|  | 36 | 45 | 1764 | 95 |
|  | 40 | 50 | 1808 | 95 |
|  | 44 | 55 | 1852 | 96 |
|  | 48 | 60 | 1896 | 95 |
|  | 52 | 65 | 1939 | 95 |
|  | 56 | 70 | 1983 | 95 |
| Comp. Example | 0 | 0 | 1205 | 83 |

Evaluation Text Example B-7)

Safety tests were carried out by using the cylindrical cells manufactured in the evaluation text example B-6. Table B-5 shows its result. However, when lithium manganate was used as a main positive electrode active material, since safety becomes higher as compared with the Co system, it is hard to confirm differences in each safety evaluation item of, e.g., a short circuit test or a hot box. As a countermeasure, in order to emphasize differences in safety under further strict conditions, the positive electrode density was set to a high value, i.e., 3.1 g/cm$^3$ to produce the cylindrical cells, and the safety evaluation was carried out. In the future, since the possibility to investigate the direction toward the higher capacity is high, performing evaluation under the high electrode density is important.

The safety evaluation items are determined as an overcharge test and a nailing test. The overcharge test was effected under the conditions of 12V and 3C. The nailing test forcibly generates the internal short circuit by nailing the battery and was carried out by using a nail of 4 mm in compliance with UL-1642.

Emission of smoke and ignition were not observed in the overcharge test even though x was not less than 56. On the other hand, in the nailing test, a small amount of steam was observed when x was not less than 40, and ignition occurred with x being equal to or above 52. Therefore, it is preferable that x is not more than 36 and a≦45 in view of safety.

TABLE B-5

|  | x | a | Overcharge Test | Nailing Test |
|---|---|---|---|---|
| Example | 4 | 5 | No Smoking/Ignition | No Smoking/Ignition |
|  | 8 | 10 | No Smoking/Ignition | No Smoking/Ignition |
|  | 12 | 15 | No Smoking/Ignition | No Smoking/Ignition |
|  | 16 | 20 | No Smoking/Ignition | No Smoking/Ignition |
|  | 20 | 25 | No Smoking/Ignition | No Smoking/Ignition |
|  | 24 | 30 | No Smoking/Ignition | No Smoking/Ignition |
|  | 28 | 35 | No Smoking/Ignition | No Smoking/Ignition |
|  | 32 | 40 | No Smoking/Ignition | No Smoking/Ignition |
|  | 36 | 45 | No Smoking/Ignition | No Smoking/Ignition |
|  | 40 | 50 | No Smoking/Ignition | Small Amount of Steam |
|  | 44 | 55 | No Smoking/Ignition | Smoking |
|  | 48 | 60 | No Smoking/Ignition | Smoking |
|  | 52 | 65 | No Smoking/Ignition | Ignition |
|  | 56 | 70 | No Smoking/Ignition | Ignition |
| Comp. Example | 0 | 0 | No Smoking/Ignition | No Smoking/Ignition |

Evaluation Test Example B-8

Lithium manganate synthesized by the same procedure as in the evaluation test example B-1 and $LiNi_{0.8}Co_{0.1}Mn_{0.1}O_2$ as a lithium-nickel composite oxide were mixed with a mixing ratio of 100−a:a when a (weight %)=0 (a comparative example), 3, 5, 10, 15, 20, 30 and 35. 5 g of the above mixed powder and the electrolyte solution of the mixed solvent (50:50 (volume %)) obtained from ethylene carbonate (EC) and diethyl carbonate (DEC) containing 10 cc of $LiPF_6$ (concentration: 1M) were put into sealed container. Here, 7 kinds of $LiNi_{0.8}Co_{0.1}Mn_{0.1}O_2$ having the specific surface areas of 3.0 m$^2$/g, 2.36 m$^2$/g, 1.50 m$^2$/g, 0.71 m$^2$/g, 0.49 m$^2$/g, 0.30 m$^2$/g and 0.25 m$^2$/g were used.

Figure 7:
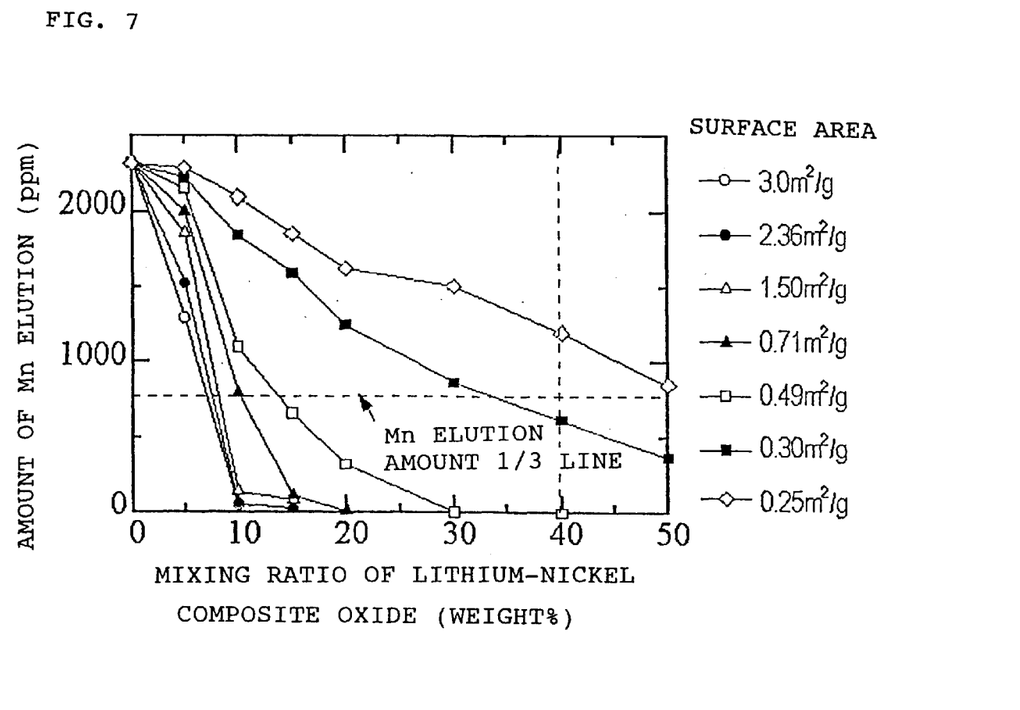
FIG. 7 is a view showing the relationship between a specific surface area of the lithium-nickel composite oxide and a quantity of Mn elution.

The thus prepared sealed containers were heated at 80° C. and left for 20 days. Thereafter, the electrolyte solution was extracted, and the Mn ion concentration in the electrolyte solution was analyzed by ICP. FIG. 7 shows its result. It was found that the effect for suppressing elution of Mn into the electrolyte solution is large as the specific surface area increases.

As described above, it is apparent that (lithium manganate):(lithium-nickel composite oxide)=100−a:a (weight %) and a≦45 are desirable in order to assure safety.

On the other hand, based on FIG. 7, when the specific surface area is 0.25 m²/g, the mixing ratio of the lithium-nickel composite oxide must be increased to 50% in order to suppress the Mn elution to ⅓ or lower of the case of containing no lithium-nickel composite oxide i.e., 2320 ppm. It is therefore understood that the specific surface area X of the lithium-nickel composite oxide should be preferably larger than 0.3 m²/g.

Evaluation Text Example B-9

Lithium manganate synthesized by the same procedure as in the evaluation test example B-1 was used as a lithium-manganese composite oxide and five kinds of $LiNi_{0.8}Co_{0.1}Mn_{0.1}O_2$ powder having the specific surface areas of 4.5 m²/g, 3.2 m²/g, 3.0 m²/g, 1.50 m²/g, 0.30 m²/g were prepared as a lithium-nickel composite oxide. Lithium manganate, $LiNi_{0.8}Co_{0.1}Mn_{0.1}O_2$ and carbon black as the conductivity-enhancing agent were dry-mixed and added into N-methyl-2-pyrrolidone (NMP) in which PVDF was dissolved as a binder. They were kneaded and uniformly dispersed to produce the slurry for a battery. Here, the mixing ratio (a=25) of lithium manganate:$LiNi_{0.8}Co_{0.1}Mn_{0.1}O_2$:a conductivity-enhancing agent:PVDF:NMP=30:10:5:5:50 (weight %) was used.

After measurement using the Brookfield viscometer, the slurry was evenly applied onto an aluminum foil having a thickness of 25 μm, and NMP was then evaporated, thereby obtaining a positive electrode sheet. Table B-6 shows the specific surface area of the lithium-nickel composite oxide, the viscosity/state of the slurry and the coating state of the electrode.

TABLE B-6

Specific Surface Area, Slurry and State of Electrode

| Specific Surface Area (m²/g) | Viscosity of Slurry (cps) | State of Slurry | State of Coating Electrode |
|---|---|---|---|
| 4.5 | 22000 | Gelled | Poor |
| 3.2 | 18000 | Gelled | Poor |
| 3.0 | 6000 | Uniformly Dispersed | Good |
| 1.5 | 5000 | Uniformly Dispersed | Good |
| 0.3 | 4000 | Uniformly Dispersed | Good |

It can be understood from Table B-6 that the slurry provokes gelation and electrode coating becomes difficult when the specific surface area is larger than 3.2 m²/g. Therefore, the specific surface area of the lithium-nickel composite oxide of not more than 3.0 m²/g is desirable.

The similar result can be obtained with the $D_{50}$ particle diameter. A $D_{50}$ particle diameter of not more than 40 μm is desirable in order to reduce elution of Mn into the electrolyte solution. As a range with which electrode coating can be facilitated, a $D_{50}$ particle diameter of not less than 3 μm is preferable.

Summing up the results of the evaluation text examples B1 to 9, as to the lithium-nickel composite oxide to be mixed, the specific surface area X of $0.3 \leq X \leq 3.0$ (m²/g) is most suitable in view of Mn elution and of coating properties and printing properties of the slurry.

Further, as to the lithium-nickel composite oxide, a $D_{50}$ particle diameter of not less than 3 μm and not more than 40 μm is most suitable in view of Mn elution and of coating properties and printing properties of the slurry.

Moreover, assuming that [Li—Mn composite oxide]:[Li—Ni composite oxide]=(100–a):a, the ratio between the lithium-manganese composite oxide and the lithium-nickel composite oxide being $3 < a \leq 45$ is preferable in view of Mn elution and of safety.

According to the present invention, since elution of Mn from the lithium-manganese composite oxide which is an active material used in a nonaqueous electrolyte solution secondary battery and changes in the Li concentration in the electrolyte solution are suppressed, it is possible to provide the nonaqueous electrolyte solution secondary battery having the greatly improved charge and discharge cycle and charge and discharge life duration at a high temperature in particular. Additionally, according to the present invention, a nonaqueous electrolyte solution secondary battery which is superior in safety can be also provided.

What is claimed is:

1. A nonaqueous electrolyte solution secondary battery, wherein a positive electrode comprises:

(A) a lithium-manganese composite oxide; and (B1) at least one lithium-nickel composite oxide which has a specific surface area X of $0.3 \leq X$ (m²/g) and which is selected from the group consisting of $LiNiO_2$, $Li_2NiO_2$, $LiNi_2O_4$, $Li_2Ni_2O_4$ and $LiNi_{1-x}M_xO_2$ (where $0 < x \leq 0.5$, and M represents at least one metal element selected from the group consisting of Co, Mn, Al, Fe, Cu and Sr), wherein when a weight ratio between said lithium-manganese composite oxide and said lithium-nickel composite oxide is represented by [Li—Mn composite oxide]:[Li—Ni composite oxide]=(100–a): a, $3 \leq a \leq 45$ is satisfied.

2. The nonaqueous electrolyte solution secondary battery according to claim 1, wherein said specific surface area X of said lithium-nickel composite oxide is $X \leq 3.0$ (m²/g).

3. The nonaqueous electrolyte solution secondary battery according to claim 1, wherein said lithium-manganese composite oxide is lithium manganate having a spinel structure.

4. The nonaqueous electrolyte solution secondary battery according to claim 1, wherein a base electrolyte salt in the electrolyte solution is $LiPF_6$ or $LiBF_4$.

5. A nonaqueous electrolyte solution secondary battery, wherein a positive electrode comprises:

(A) a lithium-manganese composite oxide; and (B2) at least one lithium-nickel composite oxide which has a $D_{50}$ particle diameter of not more than 40 μm and which is selected from the group consisting of $LiNiO_2$, $Li_2NiO_2$, $LiNi_2O_4$, $Li_2Ni_2O_4$ and $LiNi_{1-x}M_xO_2$ (where $0 < x \leq 0.5$ is satisfied, and M represents at least one metal element selected from the group consisting of Co, Mn, Al, Fe, Cu and Sr), wherein when a weight ratio between said lithium-manganese composite oxide and said lithium-nickel composite oxide is represented by [Li—Mn composite oxide]:[Li—Ni composite oxide]=(100–a):a, $3 \leq a \leq 45$ is satisfied.

6. The nonaqueous electrolyte secondary battery according to claim 5, wherein the $D_{50}$ particle diameter of said lithium-nickel composite oxide is not less than 3 μm.

7. The nonaqueous electrolyte solution secondary battery according to claim 5, wherein said lithium-manganese composite oxide is lithium manganate having a spinel structure.

8. The nonaqueous electrolyte solution secondary battery according to claim 5, wherein a base electrolyte salt in the electrolyte solution $LiPF_6$ or $LiBF_4$.

* * * * *